(12) United States Patent
Lodi

(10) Patent No.: US 12,716,717 B2
(45) Date of Patent: Aug. 25, 2026

(54) SYSTEM AND METHOD FOR MEASURING COOLING PLATE THICKNESS IN A BLAST FURNACE

(71) Applicant: PAUL WURTH S.A., Luxembourg (LU)

(72) Inventor: Giorgio Federico Lodi, Genoa (IT)

(73) Assignee: PAUL WURTH S.A., Luxembourg (LU)

( * ) Notice: Subject to any disclaimer, the term of this patent is extended or adjusted under 35 U.S.C. 154(b) by 308 days.

(21) Appl. No.: 18/707,968

(22) PCT Filed: Nov. 24, 2022

(86) PCT No.: PCT/EP2022/083173
§ 371 (c)(1),
(2) Date: May 7, 2024

(87) PCT Pub. No.: WO2023/094545
PCT Pub. Date: Jun. 1, 2023

(65) Prior Publication Data

US 2026/0160547 A1 Jun. 11, 2026

(30) Foreign Application Priority Data

Nov. 24, 2021 (LU) ........................................ 500898

(51) Int. Cl.
*G01B 17/02* (2006.01)

(52) U.S. Cl.
CPC .................................... *G01B 17/02* (2013.01)

(58) Field of Classification Search
CPC ...................................................... G01B 17/02
See application file for complete search history.

(56) References Cited

U.S. PATENT DOCUMENTS

2022/0128513 A1* 4/2022 Olivieri ..................... C21B 7/10

FOREIGN PATENT DOCUMENTS

BR 112021015299 A2 * 10/2021 ......... F27D 21/0021
CA 3236467 A1 * 6/2023 ......... F27D 21/0021
(Continued)

OTHER PUBLICATIONS

International Search Report for corresponding application PCT/EP2022/083173 filed Nov. 24, 2022; Mail date Mar. 13, 2023.
(Continued)

*Primary Examiner* — Daniel Pihulic
(74) *Attorney, Agent, or Firm* — CANTOR COLBURN LLP

(57) ABSTRACT

A system for measuring a thickness of a cooling plate, including a probe holder unit designed to fit inside a coolant channel of the cooling plate, the probe holder unit having a housing extending along a length axis, an ultrasonic probe being arranged in the housing to be able to transmit and receive ultrasonic waves from a sensor side, a rear housing part being moveably arranged at the rear side, transversally to the length axis, and elastically biased away from the sensor side, thereby permitting the probe holder unit to adapt to the cooling channel size, a drive chain to assist the progression of the probe holder unit through the length of the coolant channel, the drive chain linked to first connecting means at the first end of the housing, where a cable assembly includes electric wires connects the ultrasound probe, and an encoder arrangement is configured to cooperate with the drive chain such as to measure a length of drive chain passing along it, the encoder arrangement having a first gear meshing with the drive chain and coupled to an encoder.

16 Claims, 3 Drawing Sheets

(56) References Cited

FOREIGN PATENT DOCUMENTS

| | | | | | |
|---|---|---|---|---|---|
| CN | 113396308 | A | * | 9/2021 | ........... G01N 29/225 |
| EP | 3693690 | A1 | * | 8/2020 | ........... G01N 29/225 |
| EP | 3921586 | B1 | * | 6/2023 | ............. F27D 19/00 |
| EP | 4437302 | B1 | * | 7/2025 | ......... F27D 21/0021 |
| ES | 3038944 | T3 | * | 10/2025 | ......... F27D 21/0021 |
| FI | 4437302 | T3 | * | 8/2025 | ......... F27D 21/0021 |
| JP | S61264110 | A | | 11/1986 | |
| JP | 2010271072 | A | | 12/2010 | |
| JP | 2015169548 | A | | 9/2015 | |
| JP | 2024542514 | A | * | 11/2024 | ......... F27D 21/0021 |
| JP | WO2023094545 | A5 | * | 11/2025 | |
| KR | 20110076422 | A | | 7/2011 | |
| KR | 101482470 | B1 | * | 1/2015 | ............... G01B 5/30 |
| KR | 101594719 | B1 | | 2/2016 | |
| KR | 20210125003 | A | * | 10/2021 | ........... G01N 29/225 |
| KR | 20240113530 | A | * | 7/2024 | ......... F27D 21/0021 |
| LU | 500898 | B1 | * | 5/2023 | ............. G01B 17/02 |
| TW | 202043688 | A | * | 12/2020 | ........... G01N 29/225 |
| TW | 202330940 | A | * | 8/2023 | ......... F27D 21/0021 |
| TW | 1841674 | B | * | 5/2024 | ........... G01N 29/225 |
| WO | WO-2020161314 | A1 | * | 8/2020 | ........... G01N 29/225 |
| WO | WO-2023094545 | A1 | * | 6/2023 | ........... G01B 5/0002 |

OTHER PUBLICATIONS

Written Opinion for corresponding application PCT/EP2022/083173 filed Nov. 24, 2022; Mail date Mar. 13, 2023.

* cited by examiner 10
30.3
50.1
50
30
62
32
30.2
55
31
30.1
58
50.3
50.2
44
48.2
36.2
48
46
48.2
36.1
48
36
48.1

10
50
30
B
A
30.2
50.2
50.3
48.1
44
30.3
51
50.1
52
30.1
58
P
48.2
42
40
A
A
55
40
L
46
36
36.2
42
30.4
56
B
A 30
30.3
32
10
60
P
30.1
30.2
50
60.1
62
P
32
62
A
A
A 30
30.3
34
38
31
$D_{max}$
L
36.2
36.2
36.1
36.1
40
42
36

10
30
31
$D_{min}$
34
36

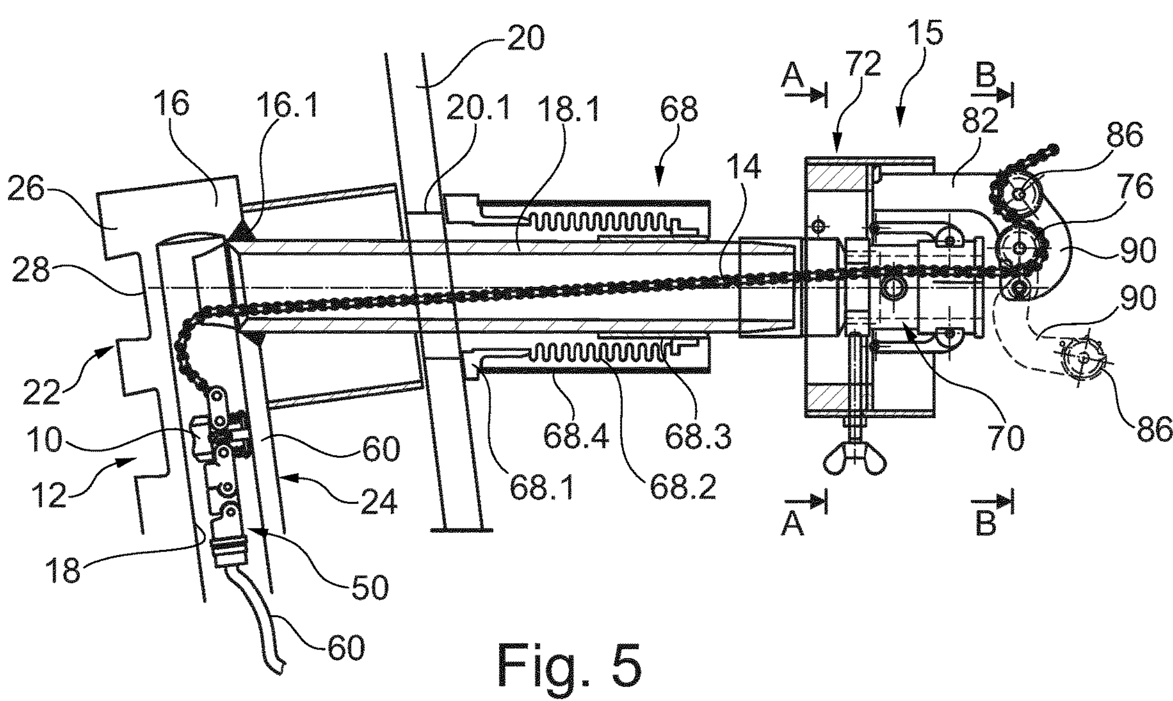
Fig. 5
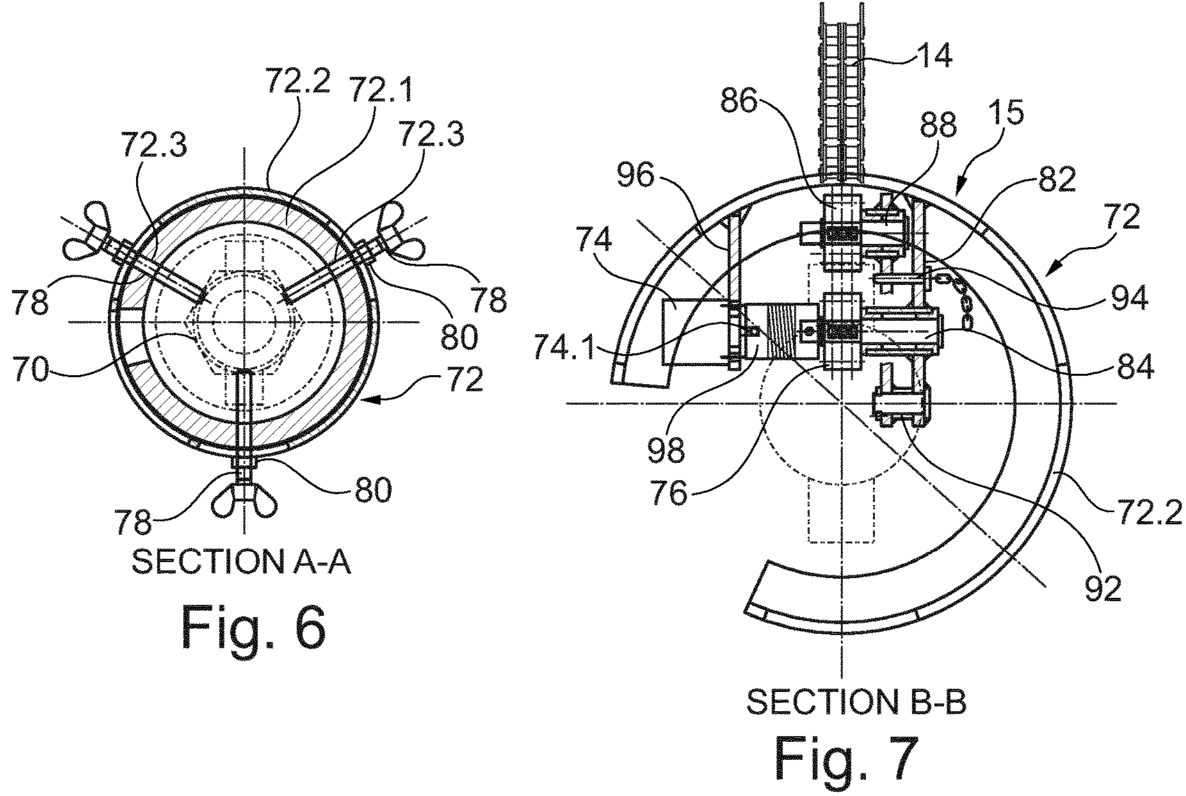
Fig. 6
Fig. 7

SYSTEM AND METHOD FOR MEASURING COOLING PLATE THICKNESS IN A BLAST FURNACE

TECHNICAL FIELD

The present disclosure generally relates to cooling plates for metallurgical furnaces, namely blast furnaces, and in particular to a system and method of measuring the residual thickness of the cooling plates.

BACKGROUND

Cooling plates for metallurgical furnaces, also called "staves", are well known in the art. They are used to cover the inner wall of the outer shell of the metallurgical furnace, as e.g. a blast furnace or electric arc furnace, to provide:

(1) a heat evacuating protection screen between the interior of the furnace and the outer furnace shell; and (2) an anchoring means for a refractory brick lining, a refractory guniting or a process generated accretion layer inside the furnace.

Originally, the cooling plates were cast iron plates with cooling pipes cast therein. As an alternative to cast iron staves, copper staves have been developed. Nowadays, most cooling plates for a metallurgical furnace are made of copper, a copper alloy or, more recently, of steel.

The refractory brick lining, the refractory guniting material or the process generated accretion layer forms a protective layer arranged in front of the hot face of the panel-like body. This protecting layer is useful to protect the cooling plate from deterioration caused by the harsh environment reigning inside the furnace. In practice, the furnace is however also occasionally operated without this protective layer, resulting in erosion of the lamellar ribs of the hot face.

While the blast furnace may be initially provided, in some cases, with a refractory brick lining on the front side of the staves, this lining may wear out during the campaign depending on the operating conditions. In particular, it has been observed that, in the bosh section, the refractory lining may disappear relatively rapidly. While an accretion layer of slag and burdening then typically forms on the hot side of the cooling plates, it actually continuously builds-up and wears out, so that during certain periods of time the cooling plates are directly exposed to the harsh conditions inside the blast furnace, conducting to the wear of the cooling plate body.

The principal causes of wear to the accretion layer, and of course to the lining and cooling plate, are the upward flow of hot gases and the rubbing of the sinking burden (coal, ore, etc.). Regarding the flow of hot gases, the wear is not only due to a thermal load, but also to abrasion by particles carried in the ascending gases.

Ultimately, therefore, the presence of a good accretion layer is strictly connected to good conduction of the blast furnace, with all the complications that the process itself requires, and to a good condition of ribs of the staves.

The state of consumption of the cooling plate ribs is particularly critical; if not sufficiently "sharpened", they cannot allow sufficient adhesion of the accretion layer itself, even in the case of good conduction of the blast furnace.

For this reason, the periodic check of the thickness of the cooling plates is of utmost importance, in particular of the ribs. Non-invasive systems like ultrasound testing technology is preferred to minimize the impact on the plant operation, avoiding to stop the plant and disturb the production.

Document JP-A2-61264110 discloses a cooling stave comprising a wear detection system using an ultrasonic probe in contact with the rear face of the stave body in order to detect erosion thereof. This system allows measuring the residual body thickness between the front and rear faces.

Document KR20110076422 discloses a thickness measurement system, wherein an ultrasonic probe is mounted at the end of a flexible extension member, which permits inserting the ultrasonic probe in the inlet and outlet regions of the coolant channel. It is thus possible to actually measure the thickness of the body between the cooling plate front side and the coolant channel. This information is of interest since it gives the residual body thickness to the coolant channel, which is critical for safe operation of the blast furnace, as introduction of water into the blast furnace must be avoided. However, this system only permits a local measurement (at the beginning and/or at the end of the coolant channel) and is today considered insufficient for a proper assessment of the condition of the cooling plate. Indeed, experience shows that often, the cooling plate is more worn in the middle body than at the extremities. Assessments based on this system thus leads to an incorrect analysis in reference to the actual general wear of the cooling plate, and therefore to an incorrect forecast of its residual life time.

KR 101 594 719 B1 discloses a stave thickness measuring apparatus wherein an ultrasonic sensor unit is connected to a driving unit, which permits inserting the ultrasonic sensor in a stave and moving the sensor inside the stave. It is thus possible to perform thickness measurements along the whole length of a stave. However, the operating principle requires installation of the ultrasonic sensor unit at each measuring point, e.g. contact legs being deployed or a balloon being inflated, to ensure close contact between the ultrasonic probe and the inner surface of the stave, which complicates the whole measuring process.

Other systems for thickness measurement of staves are disclosed in documents JP 2010 271072 A and JP 2015 169548 A.

WO 2020/161314 discloses a thickness measurement device with an expandable structure comprising pivotable levers.

BRIEF SUMMARY

The disclosure provides an alternative and reliable way of monitoring the wear status of cooling plates.

The present disclosure proposes a system for measuring a thickness of a cooling plate comprising:

- a probe holder unit designed to fit inside a coolant channel (also referred to as cooling channel) of the cooling plate, the probe holder unit comprising a housing extending along a length axis from a first end to a second end, a lateral, sensor side and an opposite rear side, an ultrasonic probe being arranged in the housing to be able to transmit and receive ultrasonic waves from the sensor side;
- a rear housing part being moveably arranged at the rear side, transversally to the length axis, and elastically biased away from the sensor side, thereby permitting the probe holder unit to adapt to the cooling channel size;
- a drive chain to assist the progression of said probe holder unit through the length of the coolant channel, the drive chain linked to first connecting means at the first end of said housing;

- a cable assembly comprising electric wires connecting the ultrasound probe;
- an encoder arrangement configured to cooperate with the drive chain such as to measure a length of drive chain passing along it, the encoder arrangement comprising a first gear meshing with the drive chain and coupled to an encoder.

The inventive ultrasound testing system provides a number of advantages. The probe holder unit, with its spring biased rear housing part, allows for self-adaptation to the cooling channel diameter. This ensures a continuous contact of the ultrasound probe to the side to be measured. The use of a chain, forming a flexible but torsionally stiff guide member, allows for a precise guiding of the probe unit in the cooling channel. Furthermore, the chain can be coupled to an encoder gear, allowing to measure the position of the probe unit inside the coolant channel without any slipping or the like.

The 'length" of the coolant channel is the greatest dimension of the coolant channel. Since the cooling plate is, in use, substantially vertical, the length may also be referred to as the 'height'.

In embodiment, the housing comprises a main housing part defining thee sensor side, the ultrasonic probe being arranged in a recess opening in the sensor side.

The main housing part may be formed of a generally semi-cylindrical wall extending between the two ends; and the rear housing part may be configured as a wall portion having a rounded outer side and an inner side complementary to a facing side of said the housing part.

In embodiments, the rear housing part comprises at least one, preferably two, pins engaged in a respective cavity in the main housing part, each pin being surrounded by a spring biasing the rear housing part away from the main housing part.

In embodiments, the rear housing part comprises lateral branches that cooperate with guide means on the main housing part, for guiding the rear housing part. The branches may comprise fingers that are engaged into grooves in the guide means, the grooves defining a sliding axis parallel to the axis of said pins.

The probe holder unit may be fixed to the drive chain by any appropriate means. Fixing means may be provided at the first side of the housing for connecting said drive chain, in particular coupling links pivotally affixed to the housing and comprising an orifice for connecting the drive chain.

Advantageously, an articulated stabilizer member is pivotally connected to the housing. The stabilizer member comprises a set of elements that are articulated on one another and are configured to form a guide housing for the cable assembly. The elements of the stabilizer member may be shaped as hollow cuboid- or parallelepiped-shape pivotally and serially connected to one another and defining a central passage for the cable assembly. Preferably, the elements of the stabilizer member are configured such that pivoting is mainly possible towards the rear side of the housing.

The use of such stabilizer member forms a protection for the cable assembly and is of particular interest to protect the cables in the angled portions of the coolant channel.

In embodiments, the encoder arrangement includes a mounting frame adapted for mounting to an outer periphery of a connection pipe or pipe coupler in communication with the cooling channel and supporting the first gear and the encoder. The first gear is located, when the mounting frame is in place on the cooling pipe or pipe coupler, such that at least part of its periphery is in axial continuity of the cooling pipe or pipe coupler. The chain may thus be discharged from the first gear in direct alignment with the connection pipe. Preferably, the second gear is provided proximate the first gear for tensioning the drive chain, the second gear being pivotally mounted on a pivotable arm fixed to said mounting frame.

The cable assembly may conveniently include a flexible hose for supplying a coupling fluid to the probe holder unit. The housing may comprise an inlet port for the fluid coupling medium and a spray orifice in the sensor side (the latter connected by an internal duct).

For protection, the wires/hose of the cable assembly are arranged in a flexible steel socket.

Advantageously, drive chain is a multi-row chain connected to the probe housing to extend longitudinally in the coolant channel, hence showing longitudinal flexibility and torsional stiffness.

The present disclosure thus provides an improved system for measuring/monitoring the thickness of cooling plates. The inventive system can use commercial ultrasound testing equipment. The combination of the ultrasound probe and encoder arrangement allows for accurate thickness measurements in relationship to the precise position (length/height) of the probe, thanks to the encoder. The UT measurements can be done continuously along the length of the coolant channel, or in a spot by spot manner, at a plurality of predefined positions.

The system, in particular the probe holder unit, is preferably periodically submitted to certification, ensuring that the system is 100% reliable for the measurements.

BRIEF DESCRIPTION OF THE DRAWINGS

The present disclosure will now be described, by way of examples, with reference to the accompanying drawings, in which:

FIG. 4: are section views B-B showing the probe holder unit in (A) rest position and (B) compressed position;

FIG. 5 is a section view through a cooling plate equipped with the present system, where the probe holder unit of FIG. 1 is inserted in a cooling channel thereof and the encoder arrangement mounted at the inlet of a connection pipe;

FIGS. 6 and 7: are section views A-A and B-B through the encoder arrangement of FIG. 5.

DETAILED DESCRIPTION OF A PREFERRED EMBODIMENT

The present disclosure relates to a system and method for measuring the thickness of cooling plates. The system includes a probe holder unit 10 designed to be inserted into coolant/cooling channels of cooling plates 12, to measure the body and ribs thickness remaining to the front side of the cooling panel. The probe holder unit 10 is driven through the cooling channel by means of a drive chain 14. An encoder arrangement 15 allows determining the position of the probe holder unit 10 inside the cooling channel. The principle of the present system is illustrated in FIG. 8.

As it is known, cooling plates 12 are used in the iron making industry for cooling the wall of furnaces such as e.g. shaft furnaces, blast furnaces or electric arc furnaces. A cooling plate comprises a body that is typically formed from a slab e.g. a cast or forged body of copper, copper alloy or steel. Furthermore, the body has at least one conventional coolant channel embedded therein. The coolant channels may be formed by cast-in pipes or by drilling through the body.

Figure 8:
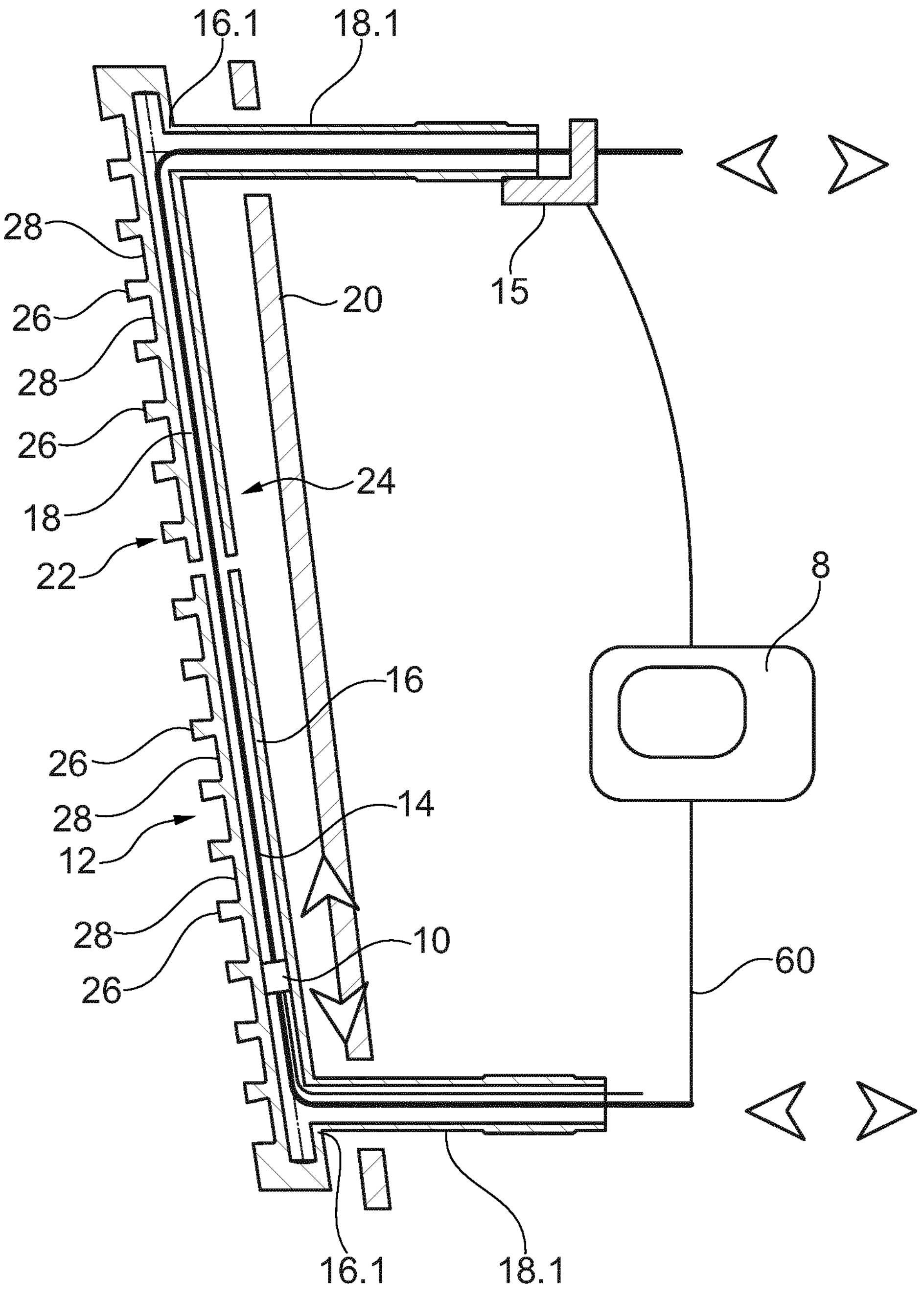
FIG. 8: is a principle diagram of the present system ready for measuring thickness of a cooling plate.

FIG. 8, shows a conventional cooling plate 12 comprising a slab-shaped cast body 16 of copper alloy comprising a plurality of coolant channels 18 (only one is seen in the Figure). The coolant channels 18 have been obtained by drilling through the shaped body from one longitudinal end to the other; then drilling top and bottom access holes 16.1 at the extremities of the coolant channel 18. The axial extremities of the coolant channel 18 are closed by plugs (not visible), whereas connection pipes 18.1 are welded to the access holes 16.1. In the blast furnace, such cooling plates 12 provide a heat evacuating protection screen between the interior of the furnace and the outer furnace shell 20 (or armour).

In the blast furnace, the cooling plate 12 is mounted onto the furnace shell. The body 16 has a front face generally indicated 22, also referred to as hot face, which is turned towards the furnace interior, and an opposite rear face 24, also referred to as cold face, which in use faces the inner surface of the furnace shell.

As is known in the art, the front face 22 of body 16 advantageously has a structured surface, in particular with alternating ribs 26 and grooves 28. When the cooling plate 10 is mounted in the furnace, the grooves 28 and lamellar ribs 26 are generally arranged horizontally in order to provide an anchoring means for a refractory brick lining (not shown).

As it is known, depending on the operating conditions of the blast furnace, the protection formed by the refractory brick lining or the accretion layer produced by process may be subject to erosion due to the descending burden material, leading to the fact that the cooling plates are unprotected—at least for a period of their life time—and have to face the harsh environment inside the blast furnace. As a result, abrasion of the cooling plates occurs too, and it is desirable to know the wear status of the cooling plates.

Reference sign 8 indicates a

Figures 1, 2, 3, 4A, 4B:
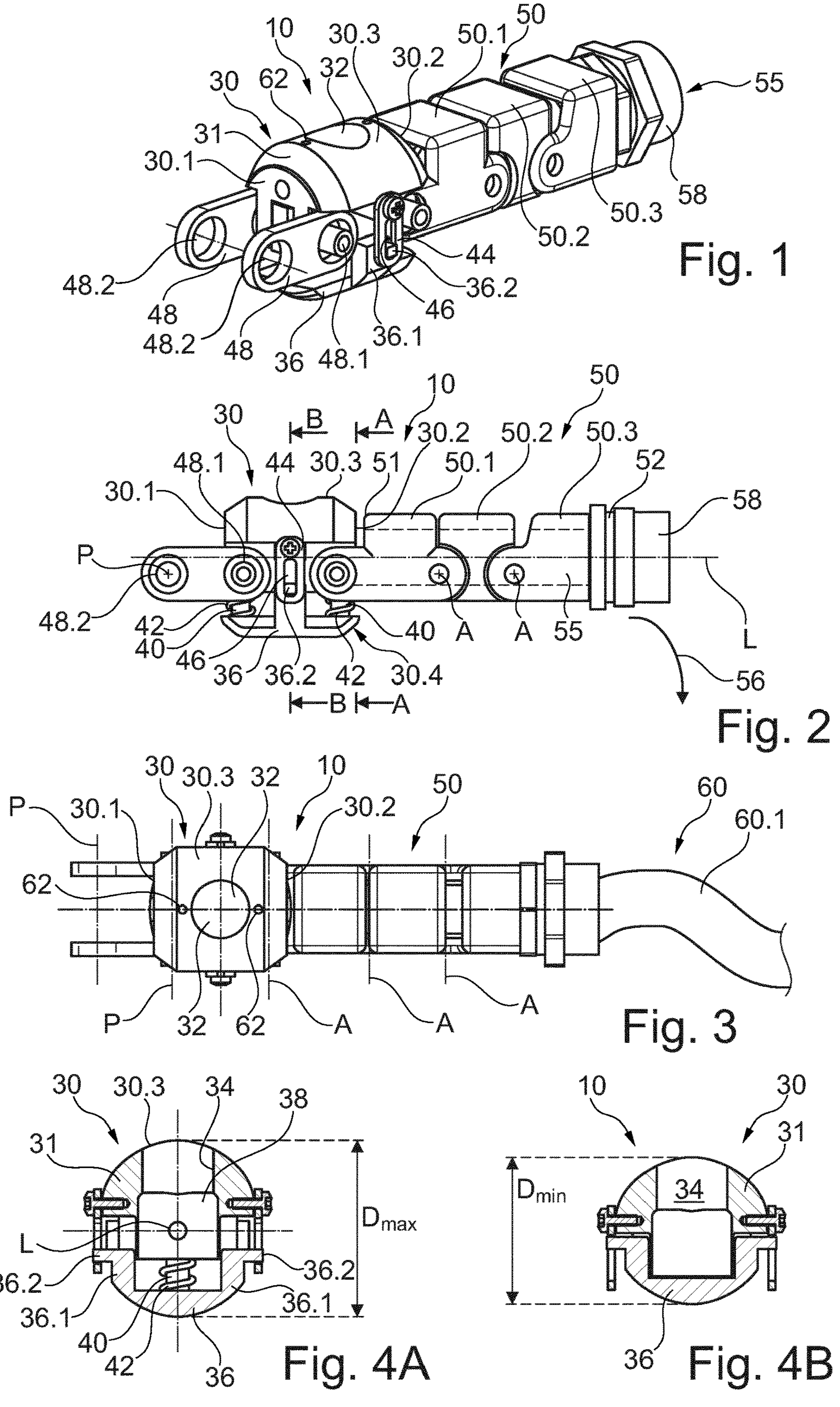
FIG. 1: is a perspective view of an embodiment of the probe holder unit according to the present disclosure.
FIG. 2: is a side view of the probe holder unit of FIG. 1.
FIG. 3: is a top view of the probe holder unit of FIG. 1.

Referring to FIG. 1, the probe holder unit 10 comprises a housing 30 in which an ultrasonic probe is arranged to be able to transmit and receive ultrasonic waves. The housing 30 is generally made from metal, e.g. aluminum alloy. As will be understood from the drawings, the housing 30 has a generally cylindrical or tubular outer shape (however not necessarily circular in cross-section), adapted to fit inside a coolant channel 18 of a cooling panel 12.

The housing 30 extends along a longitudinal axis L, from a first end 30.1 to a second end 30.2. The housing 30 has a lateral, sensor side 30.3 and an opposite back side 30.4. An ultrasonic probe 32 is arranged in the housing 30 to be able to transmit and receive ultrasonic waves from the sensor side 30.4.

Direction L is the direction in which the probe 10 is used in practice.

In the shown embodiment, the housing 30 comprises two parts or shells. The first housing part comprises a lateral housing wall 31 extending between the two ends 30.1, 30.2 and having a rounded outer surface. This housing part 31 defines the sensor side, which appears here generally as a cylinder half. The ultrasonic probe 32 is arranged in a cylindrical recess 34 in wall/part 31.

Opposite the sensor side 32.3, at the rear side 32.4, is the second housing part 36, which is moveable with respect to the first housing part 31 to allow the probe holder unit 10 to adapt to the internal diameter of the coolant channel, as will be explained below. The second housing part 36 is formed as a wall portion, which is assembled to the first housing part 31 in such a way as to be moveable with respect to the latter, transversally to the length axis L, typically perpendicularly thereto. The moveable second housing part 36 has a cylindrically shaped outer surface. In order for the probe holder unit 10 to self-accommodate to the internal diameter of the cooling channel 18, the second housing part 36 is spring biased away from the first part 31.

In the shown embodiment, the second housing part 36 comprises two lateral branches 36.1, by which it is slideably guided on the first housing part 31. With these branches 36.1, the moveable wall 36 has a kind of U-shaped cross-section.

Reference sign 38 indicates a core element that is positioned in the first housing part 31 in an internal section, preferably in alignment with the recess 34. Core element 38 may have a prismatic shape and protrudes from the first housing part 31 toward moveable wall 36. It comprises a couple of blind bores (not visible) that receives a respective pin 40 integral with the moveable wall 36 (see FIG. 2). Each pin 40 extends from the inner side of moveable wall 36, substantially perpendicularly to length axis L, and is surrounded by a compression spring 42, which bears at one end against the inner side of wall 36 and at the other end against the bottom of the blind bore in core 38. The springs 42 thus exerts an outward biasing force, which pushes the moveable wall 36 away from the first housing part 31.

The movable wall 36 forms an expandable structure, which deploys/adapts automatically such that device 10 expands over the whole inner diameter of the coolant channel 18, this deployment ensuring intimate contact between the inner surface of the coolant channel 18 and the probe holder sensor side 30.3.

FIG. 4A shows the rest position, the moveable wall 36 being in the outermost position. This is basically the configuration when the probe holder unit 10 is outside the cooling channel or in a large diameter connection pipe. In this configuration, the maximum cross-section dimension is Dmax.

FIG. 4B in turn shows the compact configuration of the probe holder unit 10, where the moveable wall 36 rests against the first housing part 31. The distance Dmin is here the minimum dimension of the probe unit 10.

In the embodiment, the branches 36.1 of the moveable wall 36 comprise outwardly protruding fingers 36.2 that fit into guide elements 44 provided with grooves 46 extending parallel to the pins 40.

Fixing means are provided at the first end 30.1 of the probe holder unit, to attach the drive chain 14. The fixing means here comprise a pair of connecting links 48 affixed to the first housing part 31. In FIG. 1, the links 48 have a first hole 48.1 by which they are pivotally fixed to the first housing part 31 by a screw or the like. The second hole 48.2 is for connection to the drive chain 14.

The connecting links 48, by way of the holes 48.1 and 48.2, define a pivoting direction P which corresponds to the centers of the holes. The pivoting direction P is perpendicular to direction L and perpendicular to the direction the pins 40.

In use, the drive chain 14 provides the desired bending capacity along the length direction L (by way of its articulated structure) while being rather stiff in the transversal direction, i.e. it is torsion resistant. The flexibility of the chain 14 together with the articulated structure of the probe holder makes it easy to take the 90° bend after the inner end of pipe. The torsional stiffness of the drive chain 14 permits controlling its orientation.

In particular, for increased strength and stiffness, the chain 14 may be a multi-row chain, e.g. duplex-type roller chain having two rows of side links.

At the second side 30.2, the probe holder unit 10 is linked to an articulated stabilizer member 50. The stabilizer member 50 comprises a set of elements 50.1, 50.2, 50.3 that are articulated on one another and are configured to form a guide housing for a cable assembly 60. The elements 50.*i* may be formed as hollow cuboid elements that define a central passage 55 in length direction L from a rear side 52 to a front side 54 adjacent second end 30.2 of housing 30. The elements 52*i* are pivotally connected to one another so that they can pivot about respective transverse axes A parallel to axe P. However, the articulation of the stabilizer member 50 is carried out with offset axes—towards the bottom on FIG. 1—such that the stabilizer member 50 may only be bent downward, i.e. on the side of rear side 30.4 and as indicated by arrow 56 in FIG. 2.

Reference sign 58 designates a fitting nut screwed on a cylindrical sleeve defining the inlet of internal passage 55 through stabilizer member 50. Fitting nut 58 is adapted to attach the cable assembly 60 to stabilizer member 50. Cable assembly is thus connected to the housing 30 through inner channel 55 inside stabilizer member 50, which it enters through an inlet defined by sleeve 55 at the rear 52.

A pair of orifices, not shown, are provided on the end side 30.2 for the input and output wires. Additionally, an inlet of an internal fluid duct (for a coupling fluid; necessary for US testing measurements) that opens at spray hole 62 in the sensor side 30.1. The cable assembly 60, which is guided inside stabilizer member 50, may thus include a pair of wires for the sensor signal as well as a flexible fluid duct, which are connected to the probe holder unit 10 through the second end 30.2. These wires and fluid ducts are advantageously arranged inside a flexible steel sock 60.1.

In use, these signal cable of the cable assembly are connected at the other end to a control unit 8, shown in FIG. 8, that is configured to operate reflection-type ultrasonic thickness measurements. Here control unit 8 also receives the signal from the encoder arrangement 15. Control unit 8 can be any appropriate commercial ultrasound testing controller.

Turning to FIGS. 5 to 7, a variant of the encoder arrangement 15 will now be described. Conventionally, connection pipe 18.1 crosses through the furnace outer wall 20 via opening 20.1 and is surrounded by a sealing box 68 comprising an annular 68.1 flange surrounding the opening 20.1 and welded to the outer wall surface. A metal bellows seal 68.2 surrounds connection pipe 18.1 and is attached at one end to the annular flange 68.1 and at the opposite end to a collar 68.3 fitted over the connection pipe 18.1 and welded thereto. The bellows seal 68.2 is protected by a surrounding metal sleeve 68.4 affixed to the annular flange 68.1.

Reference sign 70 indicates a pipe coupler fitted over the end of the connection pipe 18.1, for coupling to cooling fluid distribution piping (not shown).

The encoder arrangement 15 comprises a mounting frame 72 that is mounted on the pipe coupler 70 (but could be directly on the end of the connection pipe 18.1 where such pipe coupler 70 is absent). Mounting frame is shaped as an open annular member supporting an encoder 74 and encoder gear 76 (or first gear) coupled thereto. In use, the drive chain 14 meshes with the encoder gear 76, whereby forward or rearward movement of the drive chain 14 causes rotation of the encoder gear 76, such that the first gear rotation can be measured/detected by the encoder, and a corresponding positions/distances computed based on the encoder signal.

In the shown embodiment, the mounting frame 72 includes an inner ring 72.1 surrounded by an outer, cover ring 72.2 attached thereto, both of which are formed as open rings. The cover ring 72.2 has a wider opening than the inner ring 72.1.

The inner ring 72.1 includes three radially extending threaded bores 72.3 that receive three radially extending rods 78. The rods have an outer threaded surface and bear at one end on the pipe coupler 70 and are provided at the other end with a butterfly. Rotating the rods 78 within bores 72.3 allows fixing the mounting frame 72 on the coupler 70 in an appropriate position, preferably centered. Locking nuts 80 are provided on the rods 78 to block them in the desired radial position.

The mounting frame 72 supports various elements. Reference sign 82 designates a first angle bracket integral with the inner ring 72.1 and extending axially outside of the mounting frame circumference. Encoder gear 76 is rotatably supported on a shaft 84 protruding from first angle bracket 82. Reference sign 86 designates a second, tensioner gear that is rotatably supported on a shaft 88 extending from a pivoting arm 90. Pivoting arm is L-shaped and mounted by a pivot 92 at the free end of first angle bracket 82.

In FIG. 5 pivoting arm 90 is represented in solid lines in the operating position, where it is proximate the encoder gear 76 to ensure that the drive chain 14 remains in meshing engagement with the encoder gear 76. The arm 92 is however also represented in dashed lines in a position remote from the encoder gear 76; this corresponds to a rest configuration, where the drive chain and probe unit can be conveniently positioned. The arm 92 can be locked in the operating position by a pin 94 that engages respective aligned holes in the bracket and arm.

Reference sign 96 indicates a second angle bracket that is also fixed at one end to inner ring 72.1 and fixedly supports at the other end the encoder 74. The encoder 74 has an input axis 74.1 that is substantially aligned with the shaft 84 of the encoder gear 76 and coupled thereto via an encoder coupling 98. Encoder coupling 98 conventionally takes the form of a tubular member with annular grooves that is mounted on the encoder axis 74.1 and encoder gear shaft 84 and provides a torsionally adaptive coupling between parts.

Thickness Measurement

It may be noted that in order perform thickness measurements by means of the probe holder unit 10, the cooling plate 12 is beforehand disconnected from the furnace coolant circuit and emptied from coolant water.

In general, the drive chain 14 alone is first inserted from the upper connection pipe 18, visible in FIG. 5, and lowered through the cooling channel down to the bottom and further through the lower connection pipe, so as to exit therefrom.

Then the probe holder unit 10, with the stabilizer 50 and cable assembly 60, is connected to housing 30 by means of the links 36.

Next, the chain is withdrawn to bring the probe unit 10 towards the top of the coolant channel, as illustrated in FIG. 5. The chain 14 is then properly coupled to the encoder gear 76, by bringing tensioning gear in the operating position of FIG. 5. From there, measurements can start. The probe unit will be moved inside the cooling channel 18 by moving/escorting forward the drive chain 14 and pulling the iron cables sock 60.1 from bottom.

Inside the coolant channel 18, probe holder 10 is progressively lowered to perform thickness measurements at a plurality of positions along the length of the coolant channel 18. The present probe unit 10 allows measuring the body thickness not only at the inlet and outlet regions of the body, but also at a plurality of positions along the length of the body and ribs, including in the central regions.

In practice, the probe unit 10 is moved to a plurality of positions, and a thickness measurement is performed for each position over the entire length of coolant channel. In other words, the measurement could be done at spot (local defined positions) in at any desired length/height of coolant channel. During the thickness measurement, the sensor side 30.3 is maintained substantially perpendicular to the front side 22. The angular orientation of the probe unit 10 in the coolant channel 18 is known thanks to the configuration of the chain 60, which has a flattened cross section.

Water is preferably used as coupling medium, however any appropriate coupling fluid/medium may be used (in particular cases of presence of rusting inside the channel). The coupling fluid is supplied through the cable assembly 60, enters into the housing 30 and is sprayed against the inner surface of the coolant channel 16 by spray orifice 62.

As it will be understood, since the probe unit 10 is inserted inside the coolant channel 18, it measures a body thickness that corresponds to the distance from the inner side of the coolant channel 18 (facing the front side) to the foremost body or end rib portion on the front face, at the level of the probe holder 10 (i.e. perpendicular to the front side).

That is, when the probe is at the level of a rib 26, the body thickness corresponds to the distance between the inner surface of the channel to the tip of the rib 22.

When the probe is at the level of a groove 28, the body thickness corresponds to the distance between the inner surface of the channel to the tip of the rib 26.

As it is known in the art, in reflection (or pulse-echo) mode, the ultrasonic sensor/transducer 32 performs both the sending and the receiving of the pulsed sound waves as they are reflected back to the transducer from the interface formed by the front side of the cooling plate 12. The transducer 32 may be of any appropriate technology, e.g. piezo electric; when excited, it may typically emit very short ultrasonic pulse waves with center frequencies ranging from 1 to 15 MHz. The control unit is configured to perform thickness measurement based on the time taken by the ultrasound wave to return to the coolant channel surface. For example, the control unit may be configured to display results in the form of a signal with an amplitude representing the intensity of the reflection and the distance, representing the arrival time of the reflection. The exploitation of the ultrasonic waves is not the focus of the present disclosure and those skilled in the art may devise other ways of exploiting the transducer signals.

The invention claimed is:

1. A system for measuring a thickness of a cooling plate, said system comprising:

- a probe holder unit designed to fit inside a coolant channel of the cooling plate, the probe holder unit comprising a housing extending along a length axis from a first end to a second end, a lateral, sensor side and an opposite rear side, an ultrasonic probe being arranged in said housing to be able to transmit and receive ultrasonic waves from said sensor side;
- a rear housing part being moveably arranged at the rear side, transversally to the length axis, and elastically biased away from the sensor side, thereby permitting the probe holder unit to adapt to the cooling channel size;
- a drive chain to assist the progression of said probe holder unit through the length of the coolant channel, said drive chain linked to first connecting means at said first end of said housing;
- a cable assembly comprising electric wires connecting the ultrasound probe;
- an encoder arrangement configured to cooperate with the drive chain to measure a length of drive chain passing along it, the encoder arrangement comprising a first gear meshing with said drive chain and coupled to an encoder.

2. The System according to claim 1, wherein the housing comprises a main housing part defining said sensor side, said ultrasonic probe being arranged in a recess opening in said sensor side.

3. The System according to claim 2, wherein said main housing part is formed of a generally semi-cylindrical wall extending between the two ends; and said rear housing part is configured as a wall portion having a rounded outer side and an inner side complementary to a facing side of said main housing part.

4. The System according to any one of claim 3, wherein said rear housing part comprises at least one pins engaged in a respective cavity in said main housing part, each pin being surrounded by a spring biasing the rear housing part away from the main housing part.

5. The System according to claim 3, wherein the rear housing part comprises lateral branches that cooperate with guide means on said main housing part, for guiding the rear housing part.

6. The System according to claim 5, wherein said branches comprise fingers that are engaged into grooves in said guide means, said grooves defining a sliding axis parallel to the axis of said pins.

7. The System according to claim 1, further comprising fixing means at said first side of said housing for connecting said drive chain, the fixing means formed as coupling links pivotally affixed to the housing and comprising an orifice for connecting the drive chain.

8. The System according to claim 1, further comprising an articulated stabilizer member pivotally connected to said housing, said stabilizer member comprising a set of elements that are articulated on one another and are configured to form a guide housing for the cable assembly.

9. The System according to claim 8, wherein said elements of said stabilizer member are shaped as hollow cuboid- or parallelepiped-shape pivotally and serially connected to one another and defining a central passage for said cable assembly.

10. The System according to claim 8, wherein the elements of the stabilizer member are configured such that pivoting is mainly possible towards the rear side of the housing.

11. The System according to claim 1, wherein said encoder arrangement includes a mounting frame adapted for mounting to an outer periphery of a connection pipe or pipe coupler in communication with said cooling channel and supporting said first gear and said encoder, the first gear being located, when said mounting frame is in place on the cooling pipe or pipe coupler, such that at least part of its periphery is in axial continuity of said cooling pipe or pipe coupler.

12. The System according to claim 11, wherein a second gear is provided proximate said first gear for tensioning said drive chain, said second gear being pivotally mounted on a pivotable arm fixed to said mounting frame.

13. The System according to claim 1, wherein the cable assembly further includes a flexible hose for a coupling fluid.

14. The System according to claim 1, wherein said drive chain is a multi-row chain connected to said probe housing to extend longitudinally in said coolant channel, hence showing longitudinal flexibility and torsional stiffness.

15. The System according to claim 1, wherein said housing comprises an inlet port for a fluid coupling medium and a spray orifice in said sensor side.

16. A method of measuring the thickness of a cooling plate in a blast furnace by means of the system as claimed in claim 1, the method comprising:

isolating a cooling panel and emptying water therefrom;

installing the encoder arrangement on a top connection pipe of the cooling panel;

feeding the drive chain through the top connection pipe into the respective cooling channel, until a chain extremity comes out of the bottom connection pipe;

attaching the probe unit with cable assembly to the drive chain by the first connection means;

withdrawing the drive chain inside the coolant channel and bringing the probe holder unit in a start position;

engaging the encoder arrangement to measure the moving length of drive chain.

* * * * *